US007223671B2

(12) United States Patent
Horio et al.

(10) Patent No.: US 7,223,671 B2
(45) Date of Patent: May 29, 2007

(54) CHEMICAL CONVERSION FILM OF TANTALUM OR NIOBIUM, METHOD FOR FORMING THE SAME AND ELECTROLYTIC CAPACITOR USING THE SAME

(75) Inventors: Isayuki Horio, Kawanuma-gun (JP); Tomoo Izumi, Kawanuma-gun (JP)

(73) Assignee: Cabot Supermetals K.K., Tokyo (JP)

( * ) Notice: Subject to any disclaimer, the term of this patent is extended or adjusted under 35 U.S.C. 154(b) by 636 days.

(21) Appl. No.: 10/450,318

(22) PCT Filed: Dec. 5, 2001

(86) PCT No.: PCT/JP01/10618

§ 371 (c)(1), (2), (4) Date: Nov. 12, 2003

(87) PCT Pub. No.: WO02/48433

PCT Pub. Date: Jun. 20, 2002

(65) Prior Publication Data
US 2004/0068850 A1  Apr. 15, 2004

(30) Foreign Application Priority Data
Dec. 13, 2000  (JP) .............................. 2000-379163

(51) Int. Cl.
*H01L 21/76* (2006.01)
(52) U.S. Cl. ................ 438/408; 438/396; 257/E21.008
(58) Field of Classification Search ................ 438/408, 438/253, 396; 257/761, 516
See application file for complete search history.

(56) References Cited

U.S. PATENT DOCUMENTS

| 6,515,846 B1 * | 2/2003 | Tripp .......................... 361/508 |
| 6,663,760 B2 * | 12/2003 | Inoue et al. ................. 205/122 |
| 2004/0163965 A1 * | 8/2004 | Melody et al. ............. 205/234 |

FOREIGN PATENT DOCUMENTS

| JP | 50-104360 | 8/1975 |
| JP | 6-310649 | 11/1994 |
| JP | 6-316788 | 11/1994 |

OTHER PUBLICATIONS

D. M. Smyth et al. "Heat-Treatment of Anodic Oxide Films on Tantalum" Journal of the Electrochemical Society, Dec. 1963, vol. 110, No. 12, pp. 1264-1271.
J. S. L. Leach et al. "Crystallization in Anodic Oxide Films", Corrosion Science, 1988, vol. 28, No. 1, pp. 43-56.

* cited by examiner

Primary Examiner—Chandra Chaudhari
Assistant Examiner—Victor V. Yevsikov
(74) Attorney, Agent, or Firm—Kilyk & Bowersox, P.L.L.C.

(57) ABSTRACT

The present invention provides an electrolytic capacitor that operates stably even when used for a long period of time under severe conditions, and forms an intermediate composition portion of metal and oxide within a chemical conversion film to a thickness of 40 nm or more so as to suppress the migration of oxygen atoms within a chemical conversion film of a valve metal. This intermediate composition portion is obtained by subjecting a base metal comprised by containing nitrogen in a valve action metal to anodic oxidation treatment.

21 Claims, 2 Drawing Sheets

CHEMICAL CONVERSION FILM OF TANTALUM OR NIOBIUM, METHOD FOR FORMING THE SAME AND ELECTROLYTIC CAPACITOR USING THE SAME

This application is a National Stage entry of earlier filed International Application No. PCT/JP01/10618 filed Dec. 5, 2001.

BACKGROUND OF THE INVENTION

1. Field of the Invention

The present invention relates to an anodic oxide film of a valve action metal typically represented by tantalum or niobium (to be referred to as a chemical conversion film) and an electrolytic capacitor in which it is used.

2. Description of the Related Art

Since chemical conversion films (anodic oxide films) of valve action metals such as tantalum and niobium have satisfactory insulating properties and a high dielectric constant, they are used as the main composite material of capacitors. In particular, since chemical conversion films of tantalum also offer the advantage of stable dielectric properties relative to temperature, they are frequently used for solid electrolytic capacitors.

Although the guaranteed stable operating period of solid electrolytic capacitors differs according to the application, to the extent to which they are used in severe environments, they are required to demonstrate stable operation over a long period of time. One cause of decreased operation including changes in electrostatic capacitance is a qualitative change in the chemical conversion film due to migration of oxygen atoms within the chemical conversion film in the operating environment of the capacitor. The mechanism of this phenomenon is considered to be the result of oxygen atoms in the amorphous structure of the chemical conversion film migrating to the side of the crystalline base metal across the boundary between the chemical conversion film and metal, thereby promoting the formation of crystalline oxide at the boundary (refer to, for example, "Corrosion Science", Vol. 28, No. 1, pp. 43–56 (1988)).

Conventionally, technology for improving the operating stability of solid capacitors consisted nearly entirely of modifying the structure of the solid capacitor and the materials of the cathode and anode, or technologies relating to their forming methods, while a method for suppressing the migration of oxygen atoms as described above by changing the structure of the chemical conversion film has currently yet to be found.

An object of the present invention is to provide a highly stable chemical conversion film having a structure for suppressing the migration of oxygen atoms within the chemical conversion film. In addition, an object of the present invention is to provide an electrolytic capacitor using this highly stable chemical conversion film that is able to withstand severe usage environments and guarantee stable properties for a long period of time.

DISCLOSURE OF THE INVENTION

Oxygen present in a chemical conversion film migrates across a potential barrier to the metal side as a result of receiving energy in the operating environment of a capacitor. The energy referred to here consists mainly of electrical field energy and heat energy. As a result of studying a structure for suppressing the migration of oxygen atoms due to this mechanism, the inventors of the present invention found that the migration of oxygen atoms in a chemical conversion film is suppressed by providing an intermediate composition portion that changes from the stoichiometric composition of tantalum or niobium to tantalum or niobium metal along the direction of thickness from the surface on a chemical conversion film of tantalum or niobium, and making the thickness of this intermediate composition portion 40 nm or more, thereby achieving the present invention.

Namely, the present invention is a chemical conversion film having an intermediate composition portion of tantalum or niobium metal and tantalum or niobium oxide in a chemical conversion film of tantalum or niobium used as an anode of an electrolytic capacitor, the thickness of this intermediate composition portion being 40 nm or more.

In addition, the chemical conversion film of tantalum or niobium as claimed in the present invention prevents the migration of oxygen atoms in the chemical conversion film as a result of controlling the thickness of the intermediate composition portion by containing nitrogen in the intermediate composition portion.

Moreover, the electrolytic capacitor as claimed in the present invention suppresses the migration of oxygen atoms in a chemical conversion film to stabilize properties by having an intermediate composition portion of tantalum or niobium metal and tantalum or niobium oxide, and making the thickness of the intermediate composition portion 40 nm or more.

In this electrolytic capacitor, there is no migration of oxygen in the chemical conversion film even if energy is received under severe operating environments, thereby allowing the obtaining of an electrolytic capacitor that has highly stable properties.

In addition, the chemical conversion film of tantalum or niobium as claimed in the present invention is formed by a method in which a base material of tantalum or niobium having a nitrogen content of 2000 ppm to 12000 ppm is subjected to chemical conversion treatment.

Wire, foil or powdered sintered compact and so forth can be used for the base material of the tantalum or niobium. In the case of using powdered sintered compact of tantalum or niobium in particular, a small, large-capacitance capacitor can be obtained due to the extremely large surface area.

In this case, if the nitrogen is dissolved in the crystals of the tantalum or niobium base material in the form of a solid solution, the nitrogen is also contained in the intermediate composition portion and the thickness of the intermediate composition portion can be controlled, thereby making it possible to make the thickness of the intermediate composition portion 40 nm or more.

Furthermore, there are no particular restrictions on the method of chemical conversion treatment, and known methods in the prior art can be used.

BEST MODE FOR CARRYING OUT THE INVENTION

Figure 1:
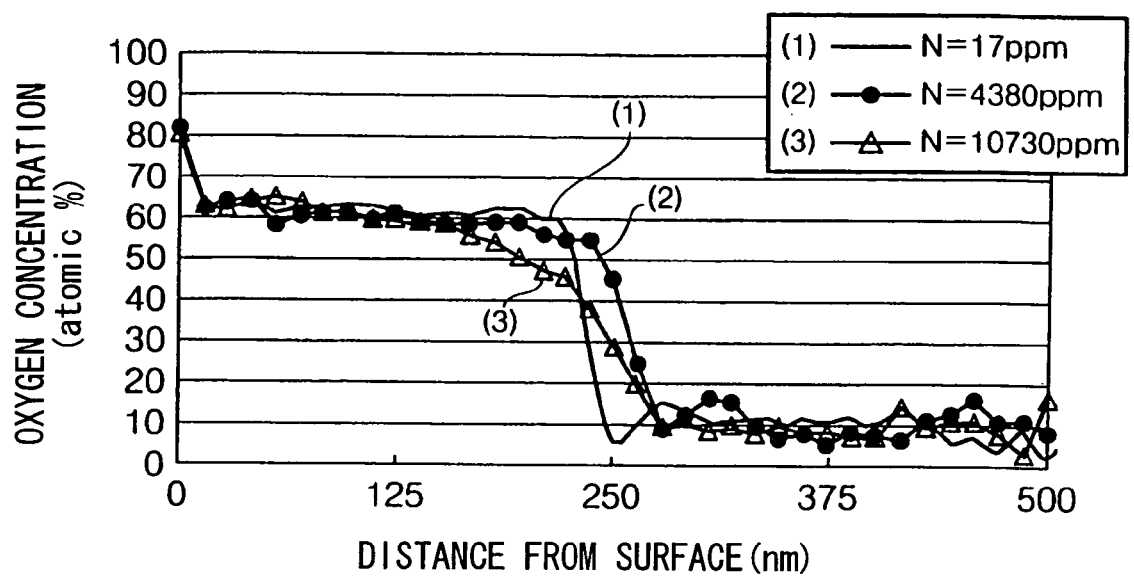
FIG. 1 is a graph showing an oxygen concentration profile of a chemical conversion film.

In general, solid electrolytic capacitors use metal wire, foil or powdered sintered compact having valve action such as that made of tantalum or niobium for the anode. The capacitor is formed by performing chemical conversion treatment (anodic oxidation treatment) on this anode, forming a chemical conversion film (oxide film) on the surface, adhering a solid electrolyte such as manganese dioxide or electrically conductive polymer thereon, and finally forming an electrode layer composed of a graphite layer and a silver paint film layer thereon. The tantalum or niobium chemical conversion film obtained by the above chemical conversion treatment acts as a powerful dielectric. For example, the portion adjacent to the metal side of a tantalum chemical conversion film consists of n-tantalum oxide that contains Ta atoms beyond that of the theoretical composition of $Ta_2O_5$ (or in other words, has a low oxygen concentration), and is estimated to have a thickness of 5 to 30 nm. The layer following this layer is a single layer considered to be a true semiconductor having the theoretical composition of $Ta_2O_5$, and this layer has a thickness proportional to the chemical conversion voltage, and acts as a dielectric that defines the electrostatic capacitance.

In the case of an ordinary tantalum or niobium chemical conversion film for which the structure is not controlled, the thickness of the intermediate composition portion is extremely thin at less than 40 nm. Furthermore, the thickness of the intermediate composition portion is typically determined by measuring the amount of oxygen in the direction of depth using the Auger electron spectroscopy method.

Oxygen in a chemical conversion film migrates across the potential barrier of the intermediate composition portion to the metal side as a result of receiving energy such as electrical field energy and heat energy in the operating environment of the capacitor. If oxygen atoms present in a chemical conversion film having an amorphous structure migrate across the chemical conversion film-metal boundary to the side of a crystalline base metal, the formation of crystalline oxide at the boundary progresses and the quality of the chemical conversion film changes, which presumably causes the electrical properties of the solid electrolytic capacitor to deteriorate.

Thus, deterioration of the electrical properties of a solid electrolytic capacitor can be prevented if the migration of oxygen is suppressed. Therefore, in the present invention, deterioration of the electrical properties of a solid electrolytic capacitor can be prevented by suppressing the migration of oxygen by making the thickness of an intermediate composition portion in a chemical conversion film 40 nm or more.

Although there are no particular restrictions on the method for increasing the thickness of the intermediate composition portion of a chemical conversion layer, any method may be employed provided it widens the distribution of electrical field diffusion distance accompanying chemical conversion treatment. As an example, a method has been employed in which elements for which the diffusion rate in a base metal is smaller than oxygen are made to be present in advance in a base metal prior to chemical conversion treatment. For example, in the case of having performed chemical conversion treatment on an anode material in which nitrogen atoms have been dissolved in the form of a solid solution, oxygen atoms for which electric field diffusion has been suppressed by nitrogen atoms have a distribution at the diffusion distance, and an intermediate composition portion is formed at a thickness corresponding to the distribution.

The suppression of the migration of oxygen atoms by a chemical conversion film having the structure of the present invention is clearly from the following experimental examples. In these experimental examples, although heat energy is applied by heat treating a chemical conversion film in a vacuum as a method for applying energy for oxygen migration, the validity of this method is clear from, for example, J. Electrochem. Soc., Vol. 110, p. 1264 (1963). In this document, it is indicated that the dielectric strength of an ordinary tantalum chemical conversion film to which nitrogen has not been added changes due to the migration of oxygen caused by the effects of heat treatment.

EXPERIMENTAL EXAMPLES

Thin sheets of tantalum containing nitrogen at 17 ppm, 4380 ppm or 10730 ppm were each subjected to chemical conversion treatment for 60 minutes at a current density of 8 $\mu A/mm^2$ when voltage is rising and chemical conversion voltage of 100 V in a 0.1% aqueous phosphoric acid solution at 60° C. When the distribution of oxygen atoms along the direction of depth was measured according to the Auger electron spectroscopy method, the results shown in FIG. 1 were obtained. In FIG. 1, the horizontal axis represents the distance from the sample surface, while the vertical axis represents oxygen concentration as atomic percent (%). Following a high peak in oxygen concentration indicating adsorbed oxygen on the sample surface, chemical conversion films are formed in which the oxygen concentration is about 60 atomic percent up to about 130 nm from the surface. Subsequently, after going through an intermediate composition portion that is equivalent to the inclined portion of the oxygen distribution, the metal composition has an oxygen concentration of 10 atomic percent or less starting at a distance of 320 nm from the surface. When the intermediate composition portion equivalent to the inclined portion of the oxygen distribution is converted to film thickness, it resulted in a thickness of 31 nm for the sample having a nitrogen content of 17 ppm (see curve (1) of FIG. 1), a thickness of 90 nm for the sample having a nitrogen content of 4380 ppm (see curve (2) of FIG. 1), and a thickness of 129 nm for the sample having a nitrogen content of 10730 ppm (see curve (3) of FIG. 1).

As is indicated above, the film thickness of the intermediate composition portion was determined to increase the higher the nitrogen content of the base material.

Figure 2:
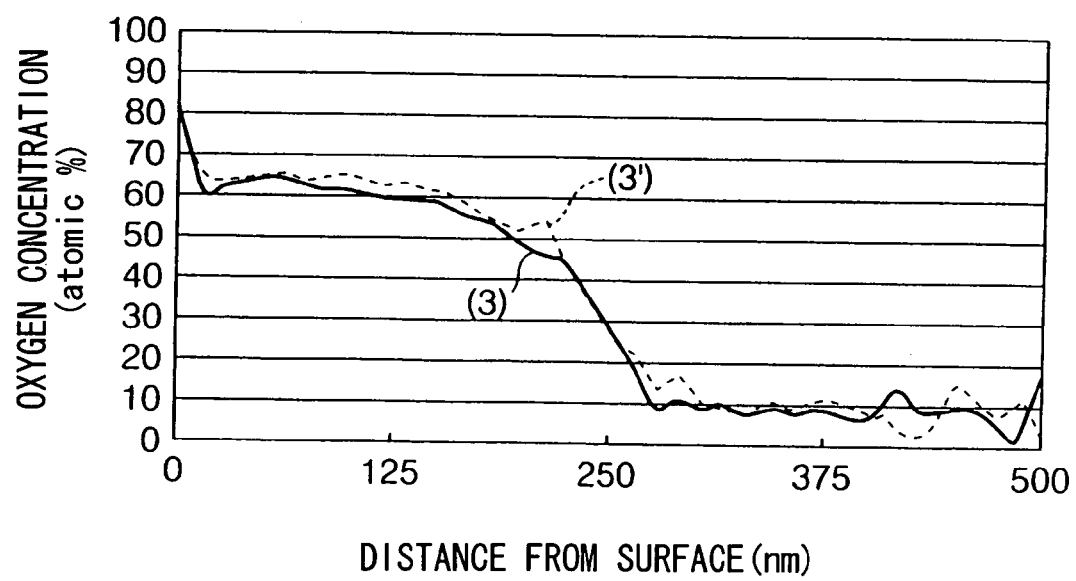
FIG. 2 is a graph showing an example of an oxygen concentration profile of a chemical conversion film following heat treatment at 480° C.

Next, the chemical conversion films in which the thickness of the intermediate composition portions were 129 nm and formed using a tantalum thin sheet containing nitrogen at 10730 ppm and obtained following chemical conversion treatment were respectively heat treated for 60 minutes at a temperature of 200° C., 340° C. or 480° C. in a vacuum for the purpose of evaluating the stability of the films. When the oxygen distribution in each of the treated chemical conversion films was measured, the oxygen distribution was no different from the oxygen distribution in the samples prior to heat treatment at each of the heat treatment temperatures, and migration of oxygen atoms was not observed. For example, as shown in FIG. 2, the oxygen profile of the sample subjected to heat treatment at 480° C. (see curve (3') in FIG. 2) was nearly the same as the oxygen profile prior to heat treatment (see curve (3) in FIG. 2), and changes in oxygen distribution were not observed.

Figure 3:
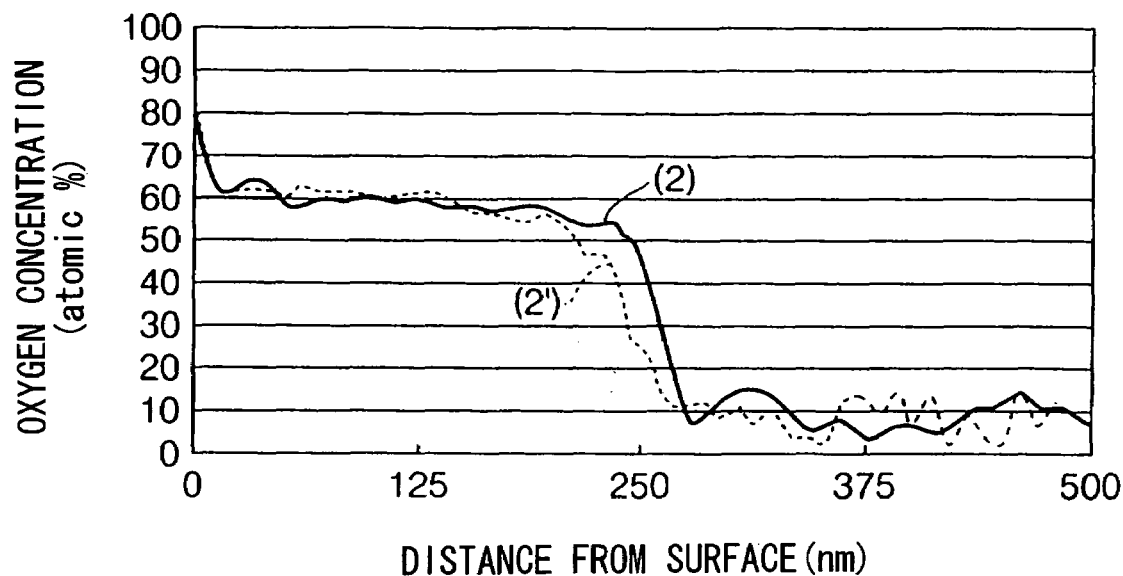
FIG. 3 is a graph showing another example of an oxygen concentration profile of a chemical conversion film following heat treatment at 480° C.

Next, stability was evaluated in the same manner as described above for chemical conversion films in which the film thickness of the intermediate composition portion was 90 nm and formed using a tantalum thin sheet containing nitrogen at 4380 ppm. As a result, although migration of oxygen atoms was not observed in the cases of heat treatment temperatures of 200° C. and 340° C., in the case of a heat treatment temperature of 480° C., migration of oxygen atoms was observed. The oxygen profile of the sample subjected to heat treatment at 480° C. is shown in FIG. 3. As shown in FIG. 3, in the oxygen profile after heat treatment (see curve (2')), the inclined portion of the oxygen distribution can be seen to have shifted towards the surface side of the chemical conversion film (left side in the drawing) as compared with the oxygen profile before heat treatment (curve (see curve (2)), thus indicating that the thickness of chemical conversion film has decreased. The oxygen of this shifted portion is equivalent to the amount of oxygen that has migrated from the chemical conversion film to the side of the tantalum metal located on the inside.

COMPARATIVE EXAMPLE

Figure 4:
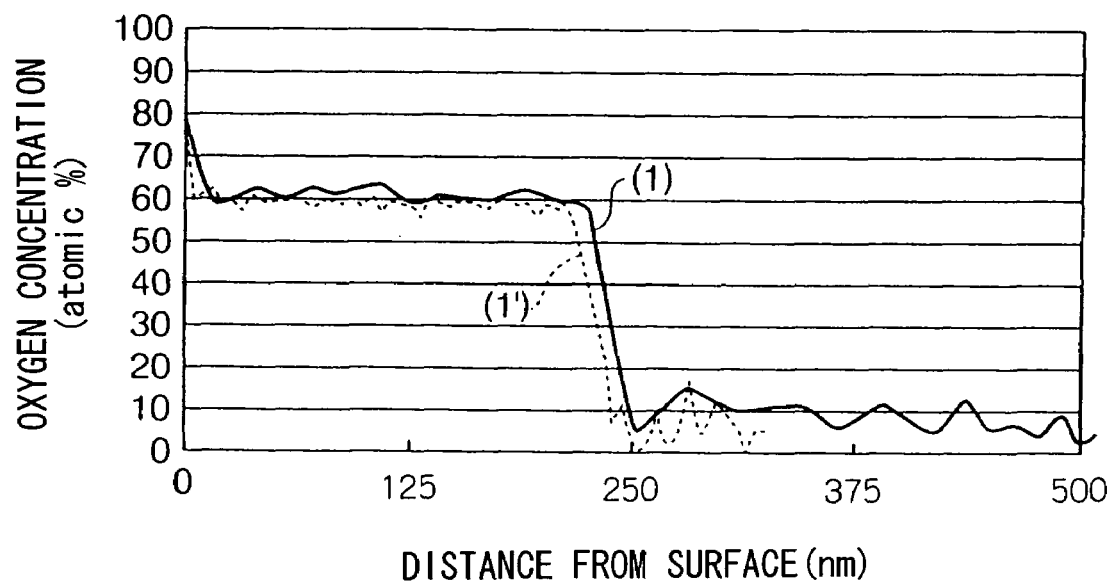
FIG. 4 is a graph showing an example of an oxygen concentration profile of a chemical conversion film following heat treatment at 340° C.

Next, the stability of chemical conversion films in which the film thickness of the intermediate composition portion was 31 nm was evaluated using a similar technique as in the case of the above experimental example by using an ordinary tantalum thin sheet containing hardly any nitrogen (nitrogen content: 17 ppm). As a result, although migration of oxygen atoms was not observed in the case of a heat treatment temperature of 200° C., in the cases of heat treatment temperatures of 340° C. and 480° C., migration of oxygen atoms was observed. The oxygen profile of the sample subjected to heat treatment at 340° C. is shown in FIG. 4. As shown in FIG. 4, in the oxygen profile after heat treatment (curve (1')), as a result of oxygen having migrated from the chemical conversion film to the tantalum metal side on the inside, the inclined portion of the oxygen distribution can be seen to have shifted towards the surface side of the chemical conversion film (left side in the drawing) as compared with the oxygen profile before heat treatment (curve (1)), thereby indicating that the thickness of the chemical conversion film has decreased. That is, oxygen migrates at a lower temperature than the case of the above experimental example because the film thickness of the intermediate composition portion is excessively thin at 31 nm.

On the basis of the above results, it can be seen that it becomes increasingly difficult for oxygen atoms to migrate as the thickness of the intermediate composition portion in the chemical conversion film increases. As a result of conducting additional studies on the basis of these facts, the conclusion was reached that, in order to maintain stable electrical properties without the occurrence of migration of oxygen atoms even in severe usage environments in which an electrolytic capacitor is actually placed, the thickness of the intermediate composition portion should be 40 nm or more, preferably 80 nm or more, and more preferably 100 nm or more. Although the thickness of the intermediate composition portion is determined by the voltage during chemical conversion treatment, it should be 40 nm or more, preferably 80 nm or more, and more preferably 100 nm or more, and should account for 40 to 60% of the thickness of the chemical conversion film. If it accounts for less than 40% of the thickness of the chemical conversion film, the migration of oxygen atoms is not adequately suppressed, while if it accounts for more than 60% of the thickness of the chemical conversion film, it is no longer possible to secure the required electrostatic capacitance for the volume of the electrolytic capacitor.

In addition, it was also determined that a tantalum or niobium base material having a nitrogen content of not less than 2000 ppm and not more than 12000 ppm should be used to obtain an intermediate composition portion of such thickness. If the nitrogen content of the tantalum or niobium base material is less than 2000 ppm, the electrical field diffusion distance of the oxygen atoms during chemical conversion treatment cannot be maintained, while if the nitrogen content exceeds 12000 ppm, the initial electrostatic capacitance decreases when the capacitor is used.

Embodiments

The following indicates concrete embodiments of the present invention.

Tantalum wire was implanted in tantalum powder containing nitrogen at 120 ppm, 4920 ppm or 10050 ppm followed by sintering in a vacuum to form anode pellets. These pellets were then respectively subjected to chemical conversion treatment for 60 minutes at a current density of 8 μA/mm$^2$ when voltage is rising and chemical conversion voltage of 100 V in a 0.1 % aqueous phosphoric acid solution at 60° C. Here, the target surface area of current density (mm$^2$) indicates the surface area of the pellets after sintering.

The anode pellets following chemical conversion obtained in this manner were respectively subjected to heat treatment for 60 minutes at a temperature of 200° C., 340° C. or 480° C. in a vacuum followed by measurement of the respective electrostatic capacitance of the anode pellets. Electrostatic capacitance was measured under conditions of a frequency of 120 Hz and bias voltage of 1.5 V in aqueous sulfuric acid solution of 30.5% by volume. The measurement results are shown in Table 1.

Based on the results of Table 1, in the case of Embodiment 1 having an intermediate composition portion of a thickness of 129 nm, electrostatic capacitance only changed from 1.05 nF/mm$^2$ to 2.52 nF/mm$^2$ even after heating to 480° C., thereby exhibiting a small amount of change and stable properties. In addition, in the case of Embodiment 2 having an intermediate composition portion of a thickness of 90 nm, electrostatic capacitance only changed from 16 nF/mm$^2$ to 1.56 nF/mm$^2$ even after heating to 340° C., and only changed moderately from 1.16 nF/mm$^2$ to 11.38 nF/mm$^2$ even after heating to 480° C., thereby exhibiting stable properties.

In contrast, in the case of the Comparative Example having an intermediate composition portion of a thickness of 31 nm, although the change in electrostatic capacitance after heating to 340° C. was from 1.16 nF/mm$^2$ to 1.61 nF/mm$^2$, exhibiting stability, the electrostatic capacitance after heating to 480° C. changed considerably by 44.9 nF/mm$^2$, thereby exhibiting properties that changed easily and lacked stability.

TABLE 1

|  | Embodiment 1 | Embodiment 2 | Comparative Example |
|---|---|---|---|
| Base material nitrogen content (ppm) | 10.050 | 4.920 | 120 |
| Thickness of intermediate composition portion (nm) | 129 | 90 | 31 |
| Initial electrostatic capacitance (nF/mm$^2$) | 1.05 | 1.16 | 1.16 |

TABLE 1-continued

|  | Embodiment 1 | Embodiment 2 | Comparative Example |
|---|---|---|---|
| Electrostatic capacitance after heat treatment (nF/mm$^2$) | | | |
| After 200° C. treatment | 1.07 | 1.19 | 1.24 |
| After 340° C. treatment | 1.18 | 1.56 | 1.61 |
| After 480° C. treatment | 2.52 | 11.38 | 44.90 |

What is claimed is:

1. A chemical conversion film comprising an intermediate composition portion of (a) tantalum and tantalum oxide or (b) niobium and niobium oxide wherein the intermediate portion has a thickness of 40 nm or more, and wherein the intermediate portion is located between an upper portion having a higher oxygen concentration and a lower portion having a lower oxygen concentration.

2. A chemical conversion film of tantalum or niobium according to claim 1, wherein the intermediate composition portion contains nitrogen.

3. An electrolytic capacitor having the chemical conversion film of tantalum or niobium according to claim 2.

4. The chemical conversion film of claim 2, wherein said intermediate portion is tantalum and tantalum oxide.

5. An electrolytic capacitor having the chemical conversion film of tantalum or niobium according to claim 1.

6. The electrolytic capacitor of claim 5, wherein the chemical conversion film is tantalum and tantalum oxide and is located on a base material of tantalum.

7. The electrolytic capacitor of claim 6, wherein said base material of tantalum has a nitrogen content.

8. The electrolytic capacitor of claim 7, wherein said nitrogen content is from 2,000 ppm to 12,000 ppm.

9. The electrolytic capacitor of claim 6, wherein said base material of tantalum is a powdered, sintered compact of tantalum.

10. The electrolytic capacitor of claim 6, wherein said base material of tantalum is tantalum foil.

11. A method for forming the chemical conversion film of claim 1 comprising chemical conversion treatment of a base material of tantalum when forming a chemical conversion film of tantalum, or niobium when forming a chemical conversion film of niobium having a nitrogen content of 2000 ppm to 12000 ppm.

12. A method for forming a chemical conversion film of tantalum or niobium according to claim 11, wherein the base material of the tantalum or niobium is a powdered sintered compact.

13. The chemical conversion film of claim 1, wherein said upper portion has an oxygen concentration of 60 atomic percent or more.

14. The chemical conversion film of claim 1, wherein said lower portion has an oxygen concentration of 10 atomic percent or less.

15. The chemical conversion film of claim 1, wherein said intermediate portion has an oxygen concentration of from about 60 atomic percent to 10 atomic percent.

16. The chemical conversion film of claim 1, wherein said thickness is 80 nm or more.

17. The chemical conversion film of claim 1, wherein said thickness is 40 nm to 129 nm.

18. The chemical conversion film of claim 1, wherein said thickness is 100 nm or more.

19. The chemical conversion film of claim 1, wherein said intermediate portion accounts for 40% to 60% of the overall thickness of the chemical conversion film.

20. The chemical conversion film of claim 1, wherein said intermediate portion is tantalum and tantalum oxide.

21. The chemical conversion film of claim 1, wherein said lower portion has a thickness of from 5 to 30 nm.

* * * * *